(12) United States Patent
Xu et al.

(10) Patent No.: US 12,477,339 B2
(45) Date of Patent: Nov. 18, 2025

(54) COMMUNICATION METHOD AND APPARATUS

(71) Applicant: HUAWEI TECHNOLOGIES CO., LTD., Guangdong (CN)

(72) Inventors: Bin Xu, Beijing (CN); Lei Chen, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/421,500

(22) Filed: Jan. 24, 2024

(65) Prior Publication Data

US 2024/0163674 A1 May 16, 2024

Related U.S. Application Data

(63) Continuation of application No. PCT/CN2022/107933, filed on Jul. 26, 2022.

(30) Foreign Application Priority Data

Jul. 27, 2021 (CN) .......................... 202110848006.4

(51) Int. Cl.
*H04W 12/30* (2021.01)
(52) U.S. Cl.
CPC .................................... *H04W 12/30* (2021.01)
(58) Field of Classification Search
CPC ...................................................... H04W 12/30
See application file for complete search history.

(56) References Cited

U.S. PATENT DOCUMENTS 8,346,261 B2 * 1/2013 Iwamura ............. H04W 12/108
380/271
9,536,078 B2 * 1/2017 Finger ..................... G06F 21/74
(Continued)

FOREIGN PATENT DOCUMENTS

| CN | 111356178 A | 6/2020 |
| WO | 2020198234 A1 | 10/2020 |
| WO | 2021125610 A1 | 6/2021 |

OTHER PUBLICATIONS

3rd Generation Partnership Project; Technical Specification Group Radio Access Network; NR; Medium Access Control (MAC) protocol specification (Release 16), 3GPP TS 38.321 V16.4.0 (Mar. 2021), total 157 pages.

*Primary Examiner* — Iral S Lakhia
(74) *Attorney, Agent, or Firm* — Rimon PC

(57) ABSTRACT

This application provides a communication method and apparatus. A transmitting apparatus performs first security processing on first control data of a user plane to obtain second control data. The first security processing comprises at least one of encryption processing or integrity protection processing. Furthermore, a packet header of the second control data comprises first security indication information, and the first security indication information indicates that the second control data underwent the first security processing. The transmitting apparatus then sends the second control data to a receiving apparatus. The receiving apparatus performs at least one of decryption processing or integrity verification processing on the second control data. In this way, network security is improved.

12 Claims, 6 Drawing Sheets

(56) References Cited

U.S. PATENT DOCUMENTS

| | | | | |
|---|---|---|---|---|
| 9,724,818 B2* | 8/2017 | Wilson | ............... | B25H 1/10 |
| 10,834,482 B2* | 11/2020 | Speicher | ............ | H04B 1/385 |
| 11,510,059 B2* | 11/2022 | Luo | ................ | H04L 9/08 |
| 11,647,391 B2* | 5/2023 | Zhang | ............... | H04L 63/20 |
| | | | | 726/26 |
| 11,758,585 B2* | 9/2023 | Da Silva | .......... | H04W 72/046 |
| | | | | 370/329 |
| 2020/0236537 A1 | 7/2020 | Lee et al. | | |
| 2020/0284883 A1* | 9/2020 | Ferreira | ............ | G01S 7/4815 |
| 2024/0334229 A1* | 10/2024 | Sen | ............... | H04W 36/0079 |

* cited by examiner

COMMUNICATION METHOD AND APPARATUS

CROSS-REFERENCE TO RELATED APPLICATIONS

This application is a continuation of International Application No. PCT/CN2022/107933, filed on Jul. 26, 2022, which claims priority to Chinese Patent Application No. 202110848006.4, filed on Jul. 27, 2021. The disclosures of the aforementioned applications are hereby incorporated by reference in their entireties.

TECHNICAL FIELD

This application relates to the field of communication technologies, and in particular, to a communication method and apparatus.

BACKGROUND

In a wireless communication system such as a new radio (NR) system, transmission content of wireless communication may be classified into control signaling and user plane data. The control signaling is transmitted via a control plane. The user plane data is transmitted via a user plane. The user plane data may be carried in a user plane data protocol data unit (PDU) and a user plane control PDU. The user plane data PDU is used to carry service data, and the user plane control PDU is used to carry control information. The control information is used to schedule or assist in transmission of the service data. For example, the control information is a status report.

As services are diversified, a communication system has an increasingly high requirement for secure transmission. Therefore, how to improve network security is an urgent problem to be resolved.

SUMMARY

This application provides a communication method and apparatus, to improve communication security.

According to a first aspect, this application provides a communication method. The method is applicable to a scenario in which a transmit end performs secure transmission. The method may be performed by an access network device, or a chip or a module in an access network device. Alternatively, the method may be performed by a terminal device, or a chip or a module in a terminal device. An example in which an execution entity is the transmit end is used for description herein. The method includes: performing first security processing on first control data of a user plane to obtain second control data, where the first security processing includes encryption processing and/or integrity protection processing; and sending the second control data.

According to the foregoing method, in a secure transmission process, the transmit end may perform the first security processing on the first control data of the user plane, and send the data obtained after the first security processing to a receive end. The first security processing includes the encryption processing and/or the integrity protection processing. Therefore, secure transmission of the user plane control data can be implemented, thereby improving wireless communication security.

In a possible implementation, before the performing first security processing on first control data to obtain second control data, the method further includes: determining, based on a preset first control data type, that the first security processing is to be performed on the first control data. The first control data type includes one or more of the following control data types: a control protocol data unit (PDU) from a service data adaptation protocol (SDAP) layer; a control PDU from a packet data convergence protocol (PDCP) layer; a control PDU from a radio link control (RLC) layer; a media access control layer control element (MAC CE); or downlink control information (DCI). In other words, the transmit end may perform the security processing on a plurality of types of user plane control data, and may further preset the first control data type that requires security processing, to implement flexible control according to a service requirement.

In a possible implementation, the determining, based on a preset first control data type, that the first security processing is to be performed on the first control data includes: obtaining first indication information, where the first indication information indicates that a first data packet belongs to the first control data type; determining the first control data based on the first data packet; and determining to perform the first security processing on the first control data. The first indication information may be carried in inter-layer signaling. The first indication information may indicate a control data type to which a data packet belongs, so that the transmit end determines whether to perform the security processing.

In a possible implementation, the first security processing may be performed at an SDAP layer, a PLDP layer, an RLC layer, a MAC layer, or a PHY layer. User plane control data generated by a plurality of protocol layers may be encrypted by one protocol layer, or user plane control data generated by a plurality of protocol layers may be separately encrypted by the plurality of protocol layers. This can be flexibly configured according to a service requirement.

In a possible implementation, the performing first security processing on first control data is based on at least one of the following parameters: a sequence number corresponding to the first control data; a count value corresponding to the first control data; a type parameter corresponding to the first control data; a logical channel identifier corresponding to the first control data; or a radio bearer identifier corresponding to the first control data. A plurality of parameters are used as input parameters of the first security processing, thereby enhancing security.

In a possible implementation, a packet header of the second control data includes first security indication information, and the first security indication information indicates that the second control data underwent the first security processing. The first security indication information indicates, to the receive end, control data on which the first security processing is performed, so that the receive end performs corresponding second security processing, to implement secure transmission.

In a possible implementation, the first control data is a MAC PDU, and the MAC PDU includes at least one control PDU and/or at least one MAC CE. In other words, the security processing may be performed on the MAC PDU as a whole. The MAC PDU may include one or more control data units. In this way, a quantity of times of the security processing can be reduced, thereby improving efficiency.

In a possible implementation, the performing first security processing on first control data to obtain second control data includes: performing the first security processing on at least two MAC subPDUs in the first control data to obtain the second control data. The MAC subPDU includes a control PDU or a MAC CE. The at least two MAC subPDUs belong to a same MAC PDU. In other words, the security processing may be performed jointly on one or more control data units. In this way, the quantity of times of performing the security processing can be reduced, thereby improving efficiency.

In a possible implementation, a packet header of a MAC PDU corresponding to the second control data includes second security indication information; and the second security indication information indicates whether the MAC PDU underwent the first security processing, or the second security indication information indicates that the MAC PDU includes a MAC subPDU that underwent the first security processing. The second security indication information is included in the packet header of the MAC PDU. In this way, the following case is avoided: The indication information is added to a packet header of each MAC subPDU, thereby reducing resource overheads.

In a possible implementation, integrity check information corresponding to the integrity protection processing includes a message authentication code-integrity or a truncated message authentication code-integrity.

According to a second aspect, this application provides a communication method. The method is applicable to a scenario in which a receive end performs secure transmission. The method may be performed by an access network device, or a chip or a module in an access network device. Alternatively, the method may be performed by a terminal device, or a chip or a module in a terminal device. An example in which an execution entity is the receive end is used for description herein. The method includes: receiving second control data of a user plane, and performing second security processing on the second control data. The second security processing includes decryption processing and/or integrity verification processing.

According to the foregoing method, in a secure transmission process, the receive end may perform the second security processing on received user plane control data. The second security processing includes the decryption processing and/or the integrity verification processing. Therefore, secure transmission of the user plane control data can be implemented, thereby improving wireless communication security.

In a possible implementation, a packet header of the second control data includes first security indication information, the first security indication information indicates that the second control data underwent first security processing, and the first security processing includes encryption processing and/or integrity protection processing. The receive end may determine, based on the first security indication information, that the corresponding second control data underwent the first security processing, and then perform the second security processing on the second control data, to obtain user plane data obtained after decryption or integrity verification, thereby improving security.

In a possible implementation, the performing second security processing on the second control data is based on at least one of the following parameters: a sequence number corresponding to the first control data; a count value corresponding to the first control data; a type parameter corresponding to the first control data; a logical channel identifier corresponding to the first control data; or a radio bearer identifier corresponding to the first control data. A plurality of parameters are used as input parameters of the first security processing, thereby enhancing security.

In a possible implementation, the second security processing may be performed at an SDAP layer, a PLDP layer, an RLC layer, a MAC layer, or a PHY layer. User plane control data generated by a plurality of protocol layers may be encrypted by one protocol layer, or user plane control data generated by a plurality of protocol layers may be separately encrypted by the plurality of protocol layers. This can be flexibly configured according to a service requirement.

In a possible implementation, the second control data is a MAC PDU, and the MAC PDU includes at least one control PDU and/or at least one MAC CE. In other words, the security processing may be performed on the MAC PDU as a whole. The MAC PDU may include one or more control data units. In this way, a quantity of times of the security processing can be reduced, thereby improving efficiency.

In a possible implementation, the performing second security processing on the second control data includes: performing the second security processing on at least two MAC subPDUs in the second control data. The MAC subPDU includes a control PDU or a MAC CE. The at least two MAC subPDUs belong to a same MAC PDU. In other words, the security processing may be performed jointly on one or more control data units. In this way, a quantity of times of the security processing can be reduced, thereby improving efficiency.

In a possible implementation, a packet header of the MAC PDU corresponding to the second control data includes second security indication information; and the second security indication information indicates whether the MAC PDU underwent the first security processing, or the second security indication information indicates that the MAC PDU includes a MAC subPDU that underwent the first security processing. The second security indication information is included in the packet header of the MAC PDU. In this way, the following case is avoided: The indication information is added to a packet header of each MAC subPDU, thereby reducing resource overheads.

In a possible implementation, before the performing second security processing on the second control data, the method further includes: determining, based on a preset first control data type, that second security processing is to be performed on the second control data. The first control data type includes one or more of the following control data types: a control protocol data unit PDU from a service data adaptation protocol SDAP layer; a control PDU from a packet data convergence protocol PDCP layer; a control PDU from a radio link control RLC layer; a media access control layer control element MAC CE; or downlink control information DCI. In other words, the transmit end may perform the security processing on a plurality of types of user plane control data, and may further preset the first control data type that requires security processing, to implement flexible control according to a service requirement.

In a possible implementation, after the performing second security processing on the second control data, the method further includes: when a result of the integrity verification processing performed on the second control data is a failure, discarding a data packet corresponding to the second control data. The receive end continues processing of only a user plane data packet that passes the integrity verification, to filter out false user plane control data or incompletely transmitted user plane control data, thereby improving network security.

In a possible implementation, the method further includes: sending second indication information. The second indication information indicates that the result of the integrity verification processing performed on the second control data is a failure. The second indication information is sent to another protocol layer of the receive end or the transmit end, to notify that the result of the integrity verification processing performed on the user plane control data is a failure, so that the another protocol layer of the receive end or the transmit end performs processing in time, thereby improving network security.

According to a third aspect, this application further provides a communication apparatus. The communication apparatus has a function of implementing any method provided in the first aspect or the second aspect. The communication apparatus may be implemented by hardware, or may be implemented by hardware executing corresponding software. The hardware or the software includes one or more units or modules corresponding to the foregoing function.

In a possible implementation, the communication apparatus includes a processor. The processor is configured to support the communication apparatus in performing corresponding functions in the foregoing methods. The communication apparatus may further include a memory. The memory may be coupled to the processor. The memory stores program instructions and data for the communication apparatus. Optionally, the communication apparatus further includes an interface circuit. The interface circuit is configured to support communication between the communication apparatus and another device.

In a possible implementation, the communication apparatus may be a terminal device, or a chip or a module in a terminal device.

In a possible implementation, the communication apparatus may be an access network device, or a chip or a module in an access network device.

In a possible implementation, the communication apparatus may be a core network device, or a chip or a module in a core network device.

In a possible implementation, the communication apparatus includes: corresponding functional modules, separately configured to implement steps in the foregoing methods. The function may be implemented by hardware, or may be implemented by hardware executing corresponding software. The hardware or the software includes one or more modules corresponding to the foregoing function.

In a possible implementation, a structure of the communication apparatus includes a processing unit and a communication unit. These units may perform corresponding functions in the foregoing method examples. For details, refer to the descriptions in the method provided in the first aspect or the second aspect. Details are not described herein again.

According to a fourth aspect, a communication apparatus is provided. The communication apparatus includes a processor and an interface circuit; and optionally, further includes a memory. The interface circuit is configured to: receive a signal from another communication apparatus other than the communication apparatus, and transmit the signal to the processor; or send a signal from the processor to another communication apparatus other than the communication apparatus. The processor is configured to execute a computer program or instructions stored in the memory, to implement the method in any possible implementation of the first aspect or the second aspect.

According to a fifth aspect, a computer-readable storage medium is provided. The computer-readable storage medium stores a computer program or instructions. When the computer program or the instructions are run on a computer, the computer is enabled to implement the method in any one of the first aspect or the second aspect and any possible implementation of any one of the first aspect or the second aspect.

According to a sixth aspect, a computer program product storing computer-readable instructions is provided. When the computer-readable instructions are run on a computer, the computer is enabled to implement the method in any one of the first aspect or the second aspect and any possible implementation of any one of the first aspect or the second aspect.

According to a seventh aspect, a chip is provided. The chip includes a processor, and may further include a memory. The processor is configured to execute a computer program or instructions stored in the memory, so that the chip implements the method in any one of the first aspect or the second aspect and any possible implementation of any one of the first aspect or the second aspect.

According to an eighth aspect, a communication system is provided. The system includes the apparatus (for example, the terminal device) in the first aspect and the apparatus (for example, the access network device) in the second aspect.

DESCRIPTION OF EMBODIMENTS

Figure 1:
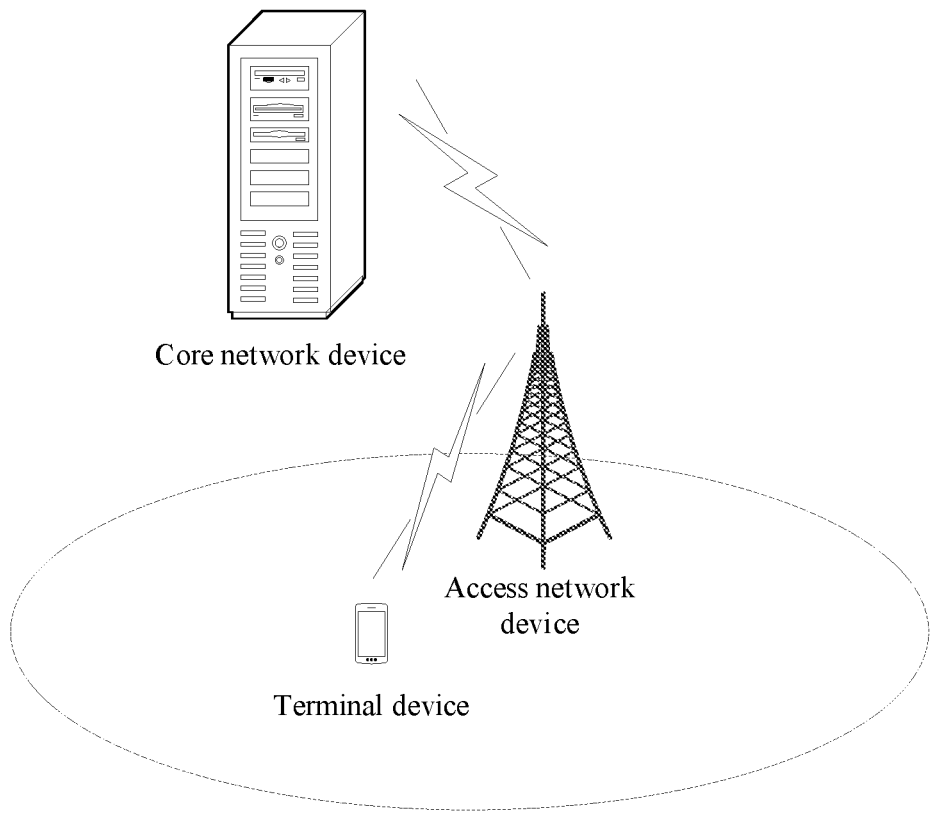
FIG. 1 is a schematic diagram of a network architecture to which this application is applicable.

The following describes embodiments of this application in detail with reference to the accompanying drawings of this specification.

Embodiments of this application may be applied to various mobile communication systems, for example, a 5th generation (5G) mobile communication network or a new radio (NR) system, a $4^{th}$ generation (4G) mobile communication network or a long term evolution (LTE) system, and another communication system such as a future communication system. This is not specifically limited herein.

In embodiments of this application, interaction between a terminal device, an access network device, and a core network device is used as an example for description. However, methods provided in embodiments of this application may be applied not only to interaction between the terminal device and a network side, but also to interaction between any two devices, for example, device-to-device (D2D) communication. This is not limited in embodiments of this application.

In embodiments of this application, the terminal device may be briefly referred to as a terminal, and is a device with wireless sending and receiving functions or a chip that may be disposed in the device. The terminal device may also be referred to as user equipment (UE), an access terminal, or the like. In actual application, the terminal device in embodiments of this application may be a mobile phone, a tablet computer, a computer with wireless sending and receiving functions, a virtual reality (VR) terminal, an augmented reality (AR) terminal, an industrial sensor, a wearable device, an intelligent monitoring terminal, a wireless terminal in industrial control, or the like. In embodiments of this application, an apparatus configured to implement functions of the terminal device may be a terminal device, or may be an apparatus, for example, a chip system, that can support the terminal device in implementing the functions. The apparatus may be installed in the terminal device, or may be used together with the terminal device.

The access network device may be a radio access device in various standards in a wireless network. For example, the access network device may be a radio access network (RAN) node that connects a terminal device to a wireless network, and may also be referred to as a RAN device or a base station. Some examples of the access network device include a next generation nodeB (gNodeB), a transmission and reception point (TRP), an evolved nodeB (eNB), a radio network controller (RNC), and the like. In a network structure, the access network device may include a central unit (CU) node, or a distributed unit (DU) node, or a CU node and a DU node. When the access network device includes the CU and the DU, a plurality of DUs may be centrally controlled by one CU. In embodiments of this application, an apparatus configured to implement functions of the access network device may be the access network device, or may be an apparatus that can support the access network device in implementing the functions, for example, a chip system. The apparatus may be installed in the access network device, or may be used together with the access network device.

The core network device may be a device configured to manage access and mobility of the terminal device, for example, may be an access and mobility management function (AMF) network element, or may be a mobility management entity (MME) network element. This is not limited in this application.

FIG. 1 is a schematic diagram of a network architecture to which this application is applicable. As shown in FIG. 1, a terminal device may access a wireless network by using an access network device, to access a service of an external network (for example, the internet) by using the wireless network, or communicate with another device by using the wireless network, for example, may communicate with another terminal device.

The network architecture and a service scenario described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of a new service scenario, the technical solutions provided in embodiments of this application are also applicable to similar technical problems.

In this application, interaction between the core network device, the access network device, and the terminal device is used as an example for description. An operation performed by the core network device may also be performed by a chip or a module in the core network device. An operation performed by the access network device may also be performed by a chip or a module in the access network device. An operation performed by the terminal device may also be performed by a chip or a module in the terminal device.

The terms "system" and "network" may be used interchangeably in embodiments of this application. "At least one" means one or more, and "a plurality of" means two or more. "And/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between associated objects. "At least one of the following items (pieces)" or a similar expression thereof indicates any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise specified, ordinal numbers such as "first" and "second" in embodiments of this application are used to distinguish between a plurality of objects, but are not used to limit sizes, content, orders, time sequences, priorities, importance degrees, or the like of the plurality of objects. For example, first indication information and second indication information are merely intended to distinguish between different indication information, but do not indicate different sizes, content, sending orders, priorities, importance degrees, or the like of two paging messages.

The following explains and describes some terms in embodiments of this application, to facilitate understanding for a person skilled in the art.

Figure 2A:
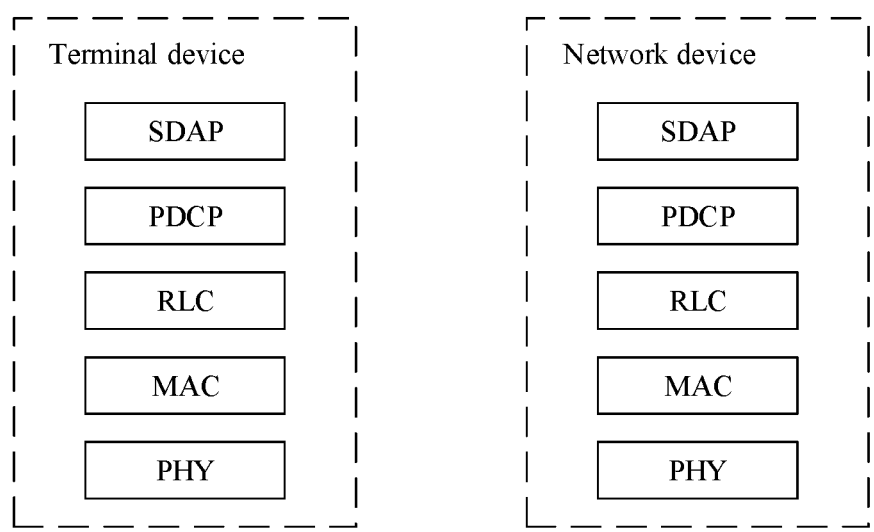
FIG. 2A is a schematic diagram of a user plane communication protocol stack.

(1) User Plane Communication Protocol Stack:

FIG. 2A is a schematic diagram of a user plane communication protocol stack. In wireless communication, a protocol stack of each of a transmit end and a receive end may be divided into a service data adaptation protocol (SDAP) layer, a packet data convergence protocol (PDCP) layer, a radio link control (RLC) layer, a media access control (MAC) layer, and a physical (PHY) layer. At the transmit end, data is transmitted from a higher layer to a lower layer, and the data reaches the PDCP layer through the SDAP layer. The data is processed by the PDCP layer, and then processed data is transmitted to the RLC layer and the MAC layer, and finally is sent out from the physical layer. Correspondingly, at the receive end, data is transmitted from a lower layer to a higher layer. Data on each radio bearer needs to be processed by each layer, and each layer has a corresponding functional entity to perform a corresponding function.

Figure 2B:
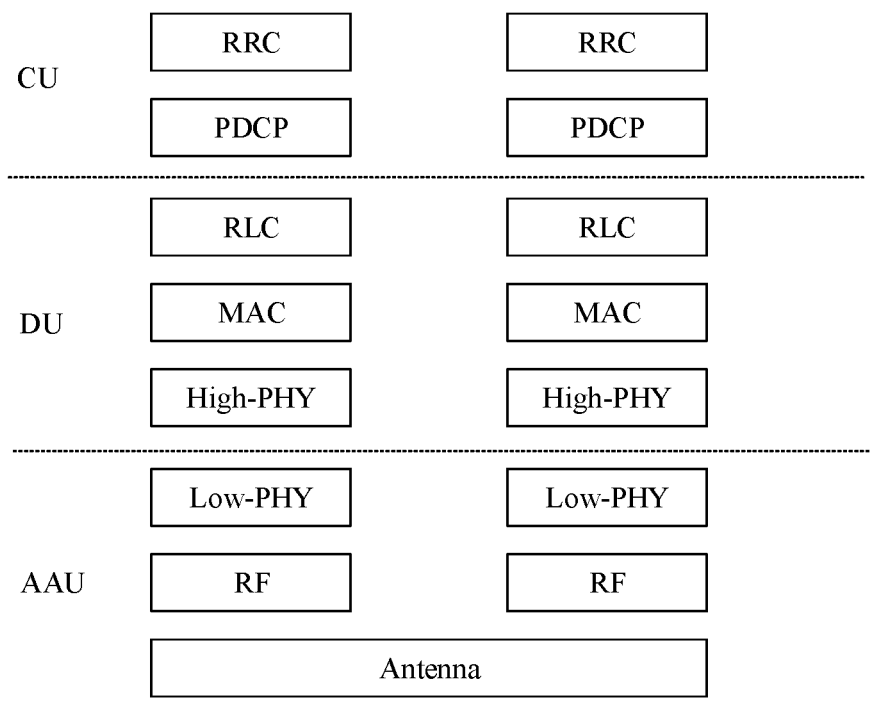
FIG. 2B is a schematic diagram of another user plane communication protocol stack.

FIG. 2B is a schematic diagram of another user plane communication protocol stack. In a central unit-distributed unit (CU-DU) split architecture, a bottom physical layer of a baseband unit (BBU) of a 4G base station is moved down to an active antenna unit (AAU) for processing. A higher physical layer, a MAC layer, and an RLC layer that have a high real-time requirement are processed in a DU. A PDCP layer, an SDAP layer, and a radio resource control (RRC) layer that have a low real-time requirement are processed in a CU. A secure transmission method provided in this application is not only applicable to the two communication architectures in FIG. 2A and FIG. 2B. With evolution of a network architecture and emergence of a new service scenario, technical solutions provided in embodiments of this application are also applicable to similar technical problems.

(2) User Plane Control PDU:

Wireless communication data may be classified into control signaling and user plane data. Generally, the user plane data is carried on a data plane channel (or understood as a data radio bearer), and the control signaling is carried on a control plane channel (or understood as a control radio bearer). The user plane data may be further classified into a user plane data PDU and a user plane control PDU. The user plane data PDU is used to carry communication content data, and the user plane control PDU is used to carry control information that assists transmission of the user plane data PDU, for example, a status report, robust header compression (RoHC) feedback, and Ethernet header compression (EHC) feedback. The user plane data PDU includes a data PDU of each protocol layer, for example, an SDAP data PDU, a PDCP data PDU, or an RLC data PDU. The user plane control PDU is used to carry the control information that assists transmission of the data PDU, and includes a control PDU of each protocol layer, for example, an SDAP control PDU, a PDCP control PDU, or an RLC control PDU. In addition to the user plane control PDU in the foregoing examples, there is other control information, for example, a MAC CE and a control PDU of a new protocol layer that may be defined in a future communication system. In addition, this embodiment of this application is also applicable to security processing performed on downlink control information (DCI). For ease of description, the control PDU of each protocol layer, the MAC CE, and the DCI are collectively referred to as a user plane control PDU below.

Figure 3:
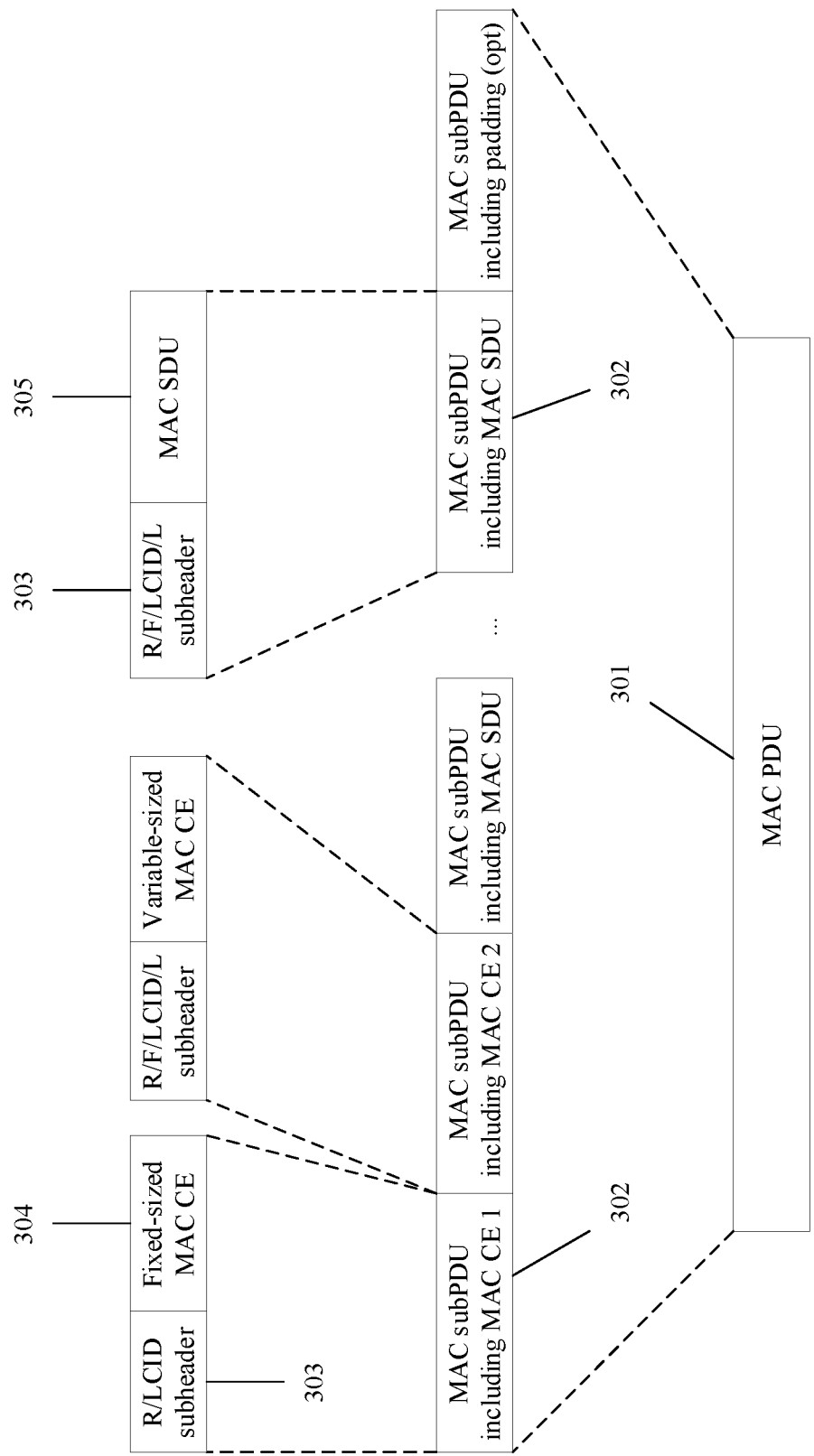
FIG. 3 is a schematic diagram of composition of a MAC PDU.

A secure transmission method provided in this application may be used to transmit the user plane control PDU. In the schematic diagram of a MAC PDU shown in FIG. 3, MAC PDU (301) includes at least one MAC subPDU. When receiving an RLC PDU delivered by an RLC layer, a MAC layer uses the RLC PDU as a MAC SDU (305) and encapsulates the MAC SDU into a MAC subPDU (302). In addition, the MAC layer may generate a MAC CE (304) and encapsulate the MAC CE into a MAC subPDU. Each MAC subPDU includes a MAC subheader (303). The MAC layer may combine a plurality of MAC subPDUs into a complete MAC PDU through a multiplexing function.

(3) Encryption Processing and Decryption Processing:

The transmit end converts data plaintext into ciphertext through operation processing by using an encryption algorithm/a decryption algorithm based on a parameter such as a key. A receive end converts the ciphertext into the data plaintext through inverse operation processing by using the encryption algorithm/the decryption algorithm based on a parameter such as a corresponding key.

(4) Integrity Protection and Verification:

The transmit end obtains, through calculation based on parameters such as a data packet and a key, a parameter A by using an integrity protection algorithm/a verification algorithm. The receive end obtains, through calculation based on parameters such as a data packet and a corresponding key, a parameter B by using the integrity protection algorithm/the verification algorithm. If the parameter A is consistent with the parameter B, the integrity verification succeeds. If the parameter A is inconsistent with the parameter B, the integrity verification fails.

(5) Illegal Terminal Device and Illegal Network Device:

In embodiments of this application, a legal terminal device may be a terminal device authorized by a legal operator or a legal terminal vendor, or a terminal device carrying a legal subscriber identity module (SIM) card. In addition, a legal terminal device may also be a terminal device that has a subscription relationship with a network device or a terminal device carrying a SIM card that has a subscription relationship with a network device. The network device stores subscription information of the terminal device or the SIM card, so that the legal terminal device can obtain a communication service provided by the network device. The legal terminal device accesses the network device for an object of obtaining a normal communication service, and has a legal terminal device identifier. The illegal terminal device accesses the network device for a purpose of attacking the network device. Because the illegal terminal device usually does not have a subscription relationship with a network, the illegal terminal device cannot directly obtain the normal communication service, and can only pretend to be a legal terminal device and send a large quantity of messages to the network device to attack the network device, thereby consuming network resources. The illegal network device, such as a pseudo base station, is not authorized by the legal operator or the legal terminal vendor, or the illegal network device accesses the communication network for the object of attacking the network device. For ease of description, the illegal terminal device and the illegal network device are collectively referred to as an illegal communication device below.

With reference to the foregoing description, with evolution of wireless communication, a requirement for communication security becomes increasingly strict. If control data carried in a user plane control PDU is used by an illegal communication device, a throughput may decrease, and even normal communication cannot be implemented. On this basis, this application provides a secure transmission method in which encryption and/or integrity protection are/is performed on a user plane control PDU, thereby improving communication security.

The communication method provided in this application may be applied to the SDAP layer, the PDCP layer, the RLC layer, the PHY layer, and/or the MAC layer in the foregoing user plane communication protocol stack. For ease of description, an example in which first security processing is performed at the MAC layer is used for description. The security processing is also applicable to other protocol layers.

Figure 4:
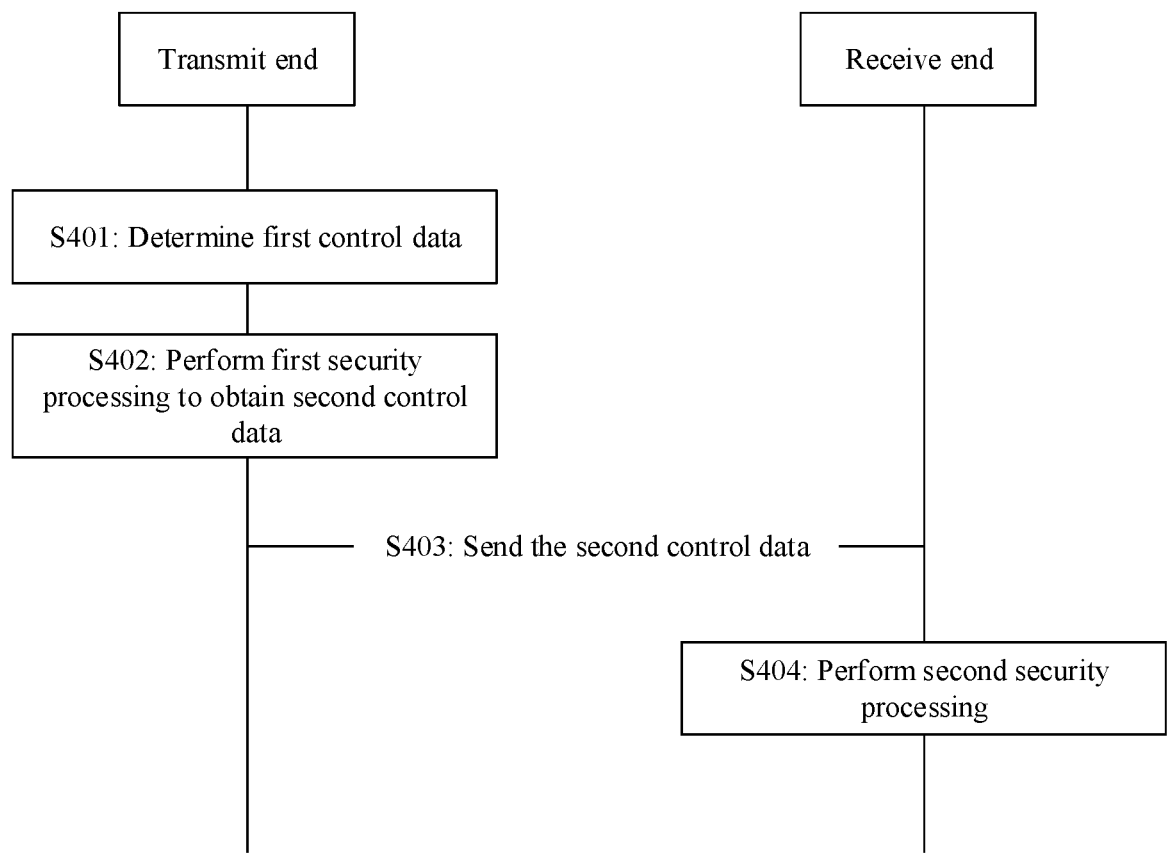
FIG. 4 is a schematic flowchart of a communication method according to an embodiment of this application.

FIG. 4 is a schematic flowchart of a communication method according to an embodiment of this application. The method includes the following steps:

Optionally, S401: A transmit end determines first control data, where the first control data includes at least one user plane control PDU.

S402: The transmit end performs first security processing on the first control data of a user plane to obtain second control data, where the first security processing includes encryption processing and/or integrity protection processing.

S403: The transmit end sends the second control data to a receive end, and correspondingly, the receive end receives the second control data from the transmit end.

S404: The receive end performs second security processing on the second control data, where the second security processing includes decryption processing and/or integrity verification processing.

In the communication method provided in this application, the transmit end performs encryption and/or integrity protection on the user plane control PDU, and the receive end performs decryption and/or integrity verification on the user plane control PDU by using a parameter corresponding to the transmit end, thereby improving communication security. This application is applicable to both uplink transmission and downlink transmission. When this application is applied to the uplink transmission, the transmit end is a terminal device, and the receive end is a network device. When this application is applied to the downlink transmission, the transmit end is a network device, and the receive end is a terminal device. For ease of description, the following uses the transmit end and the receive end for description.

In step S401, the transmit end determines the first control data, where the first control data includes the at least one user plane control PDU.

The first control data is control data on which the first security processing is determined to be performed, or may be understood as control data on which the first security processing needs to be performed. The user plane control PDU includes a control PDU from an upper layer and a MAC CE. For a MAC layer, the control PDU from the upper layer includes a control PDU from an SDAP layer, a control PDU from a PDCP layer, and a control PDU from an RLC layer. After receiving the control PDU from the upper layer, the MAC layer uses the control PDU from the upper layer as a load of a MAC subPDU, adds a MAC subheader, and encapsulates the MAC subheader into the MAC subPDU. In addition, the MAC layer may also use the MAC CE as a load of a MAC subPDU, add a MAC subheader, and encapsulate the MAC subheader into the MAC subPDU. The first control data described in this embodiment of this application may be understood as a MAC subPDU including a load and a MAC subheader as a whole, or may be understood as including only a load. When the first control data is the MAC subPDU, in subsequent security processing, the MAC subheader may be removed before the security processing is performed on a MAC subSDU or the MAC CE, or the security processing may be performed on the MAC subPDU including the MAC subheader as a whole.

In a possible implementation, the first control data includes only one user plane control PDU, for example, includes only one MAC CE. In another possible implementation, the first control data includes a plurality of user plane control PDUs, for example, includes a plurality of MAC CEs. For another example, the first control data includes a plurality of control PDUs from the upper layer. For another example, the first control data includes at least one MAC CE and at least one control PDU from the upper layer. In other words, the first control data may be understood as a set of at least one user plane control PDU. A connection form of the at least one user plane control PDU in the first control data is described in detail below.

A manner of determining the first control data by the transmit end includes the following two implementations: an implementation A and an implementation B.

In the implementation A, it is determined, based on a preset first control data type, that the first security processing is to be performed on the first control data.

Optionally, the method further includes step S4011: Determine the preset first control data type.

The preset first control data type may be predefined by a protocol, or may be indicated by the upper layer. Alternatively, when the transmit end is the network device, the preset first control data type may be preconfigured; or when the transmit end is the terminal device, the preset first control data type may be configured by the network device. When the first security processing includes the encryption processing and the integrity protection processing, the preset first control data type may uniformly indicate a type of control data on which the two types of security processing need to be performed. Alternatively, the preset first control data type may separately indicate a type of control data on which encryption needs to be performed and a type of control data on which integrity protection needs to be performed. In this way, flexible configuration may be implemented to adapt to network environments or service transmission with different requirements.

The first control data type includes at least one of the following: a control PDU from the SDAP layer; a control PDU from the PDCP layer; a control PDU from the RLC layer; a MAC CE at the MAC layer; or DCI. Different first control data types may be preset to meet requirements in different service scenarios, so that different secure transmission manners are configured for services with different security requirements, thereby improving communication transmission security and resource utilization. In a possible implementation, the first control data type is determined based on a corresponding radio bearer. Whether to perform the security processing on the radio bearer and a type of the security processing may be configured. If it is configured that the security processing needs to be performed on the radio bearer, the security processing needs to be performed on data on the radio bearer. For example, if it is configured that the integrity protection processing needs to be performed on the first radio bearer, and the first radio bearer is used to transmit first data, it may be determined that the first data belongs to the first control data type, and the integrity protection processing needs to be performed on the first data. A new configuration granularity is provided by configuring security processing on a radio bearer, so that a configuration procedure can be simplified and efficiency can be improved.

Further, optionally, the method further includes step S4012: Obtain first indication information, where the first indication information indicates that a first data packet belongs to the first control data type; determine the first control data based on the first data packet; and determine to perform the first security processing on the first control data.

The first data packet is a control PDU from the upper layer. The MAC layer is used as an example. The RLC layer sends a control PDU to the MAC layer, and the MAC layer determines the control PDU as an SDU after receiving the control PDU. The first data packet may be the control PDU or the SDU. When receiving the first data packet, the MAC layer may further receive the first indication information. The first indication information indicates a type of the first data packet, or indicates that the first data packet belongs to the first control data type. In this case, the MAC layer may determine that the security processing needs to be performed on the first data packet, determine that the first data packet is the first control data, and determine to perform the first security processing on the first control data. A process of determining the first control data based on the first data packet may alternatively include determining the first control data based on a plurality of data packets. A method is described in detail below.

The first indication information may be type indication information. The type indication information indicates whether the data packet is a user plane control PDU, or indicates a service type of a user plane control PDU corresponding to the data packet. The type indication information may be explicitly or implicitly indicated by using inter-layer signaling, or the type indication information may be an indication field in the data packet. For example, when the data packet is the user plane control PDU, the RLC layer may send the type indication information to the MAC layer. When the data packet is not the user plane control PDU, the RLC layer does not send the type indication information. Correspondingly, when receiving the type indication information, the MAC layer may determine that the data packet belongs to the user plane control PDU, or may further determine the service type of the user plane control PDU. When the MAC layer does not receive the type indication information, the MAC layer may determine that the data packet does not belong to the user plane control PDU.

The foregoing inter-layer signaling indicates signaling interaction between different protocol stacks in a same network entity. That the MAC layer performs the first security processing is used as an example. The RLC layer may send the inter-layer signaling to the MAC layer to indicate a type of the data packet. When the first security processing is performed by another protocol layer, the another protocol layer may receive signaling from a corresponding upper layer. Further, in a CU-DU architecture, when the PDCP layer needs to send a message to the RLC layer, a CU needs to send the message to a DU by using F1 interface signaling. For example, in the CU-DU architecture, the PDCP layer sends the first indication information to the RLC layer by using the F1 interface signaling, and the RLC layer sends the first indication information to the MAC layer, to indicate whether a data packet from the PDCP layer includes a control PDU. The type of the data packet from the upper layer may be indicated by using the inter-layer signaling, so that different processing is performed based on different types of data packets, thereby implementing secure transmission of a plurality of services.

In a possible implementation, the data packet including the control PDU is segmented at the upper layer. For example, if the data is transmitted in segments because the data is excessively long, the upper layer may send the type indication information when transmitting the segmented data, to indicate that each segment includes the control PDU. For example, the RLC layer divides data in the control PDU into two PDUs for transmission, and sends the two PDUs to the MAC layer. The RLC layer may further send a piece of first indication information to indicate that the two segments both include the control PDU, so that the MAC layer performs the security processing on a plurality of data packets obtained after segmentation. In this way, the security processing can be performed on a plurality of segments by sending only the first indication information, and the first indication information does not need to be sent for each segment, thereby reducing resource overheads of the first indication information.

After determining the type of the data packet based on the type indication information, the transmit end may determine the first control data based on the preset first control data type. For example, when receiving a data packet from the RLC layer, the MAC layer may determine a type of the data packet based on type indication information in the data packet. If the data packet belongs to the first control data type, the MAC layer may determine that the security processing needs to be performed on the data packet. The security processing for different services may be controlled differently by presetting the first control data type. For example, the security processing may be performed on data corresponding to a service with a high security risk or a high security requirement, and the security processing is not performed on data corresponding to a service with a low security risk or a low security requirement, to properly arrange communication resources, thereby ensuring communication security and reducing power consumption for the network device.

Step S4012 is an optional step. The transmit end may not receive the type indication information, and determine the first control data based on only the preset first control data type. For example, if the preset first control data type is a MAC CE, after generating the MAC CE, the MAC layer may determine that the MAC CE belongs to the preset first control data type, to determine the first control data. In this implementation, transmission security of the MAC CE can be improved without introducing inter-layer signaling, and an operation is simple and easy to implement.

In the implementation B, A data packet and second indication information are received from the upper layer, and it is determined based on the second indication information to perform the first security processing on the data packet.

The second indication information indicates that the security processing needs to be performed on the data packet. For example, the second indication information may indicate that the encryption processing and/or the integrity protection processing need/needs to be performed on the data packet. After receiving the data packet and the second indication information from the upper layer, the MAC layer may determine, based on the second indication information, whether the security processing needs to be performed on the data packet. If the security processing needs to be performed on the data packet, the MAC layer may determine that the data packet is the first control data. In this implementation, an upper layer protocol stack of a sending device needs to send the second indication information only for the data packet on which the security processing needs to be performed, to indicate to perform the security processing on the data packet, and does not need to preset a running rule or a data type that requires the security processing, so that the security processing of the user plane control PDU can be simply and conveniently implemented.

In step S402, the transmit end performs the first security processing on the first control data of the user plane to obtain the second control data. The first security processing includes the encryption processing and/or the integrity protection processing.

In other words, the transmit end performs the first security processing on the first control data of the user plane, and data obtained after the first security processing is referred to as the second control data.

Optionally, performing the first security processing on the first control data is based on at least one of the following parameters:

a first key;
a sequence number (SN) corresponding to the first control data;
a count value corresponding to the first control data;
a type parameter corresponding to the first control data;
a logical channel identifier corresponding to the first control data; or
a radio bearer identifier corresponding to the first control data.

The first key may be configured by a core network device and transparently forwarded to a terminal device by using an access network device. In this embodiment of this application, the first key may be a non-access stratum (NAS) key, for example, a key that is allocated by the core network device to the terminal device and that is used to perform the security processing on a NAS message. Alternatively, the first key may be another type of key allocated by the core network device, for example, may be a key specially used to verify legality of the terminal device. This is not limited herein. In a possible implementation, the first key may have an association relationship with the terminal device. For example, the first key may uniquely correspond to a terminal identifier of the terminal device. In other words, the first key is allocated only to the terminal device. In another possible implementation, the first key may have an association relationship with a first device group to which the terminal device belongs. For example, the first key may uniquely correspond to a group identifier of the terminal device. In other words, all terminal devices in the same group with the terminal device correspond to the same first key. For example, when the first key is allocated based on the group identifier of the terminal device, the core network device divides a plurality of terminal devices into several groups, and one first key is allocated to each group. In other words, a terminal devices in the same group with the terminal device correspond to the same first key.

The sequence number may be a sequence number maintained by the MAC layer for each MAC PDU, and the MAC layer of the receive end maintains the sequence number in a same manner, to ensure that sequence numbers determined by two sides are consistent.

The count value may be a count value that is of the MAC layer and that corresponds to the first control data. A length of the count value may be 32 bits. To ensure that the transmit end implements sequential sending, a MAC entity of the transmit end maintains a count value for each data packet. When sending data, the transmit end sequentially sends the data based on an ascending order of the count values of the data packets. Correspondingly, a MAC entity at the receive end maintains a count value for each data packet by using a same calculation method, to ensure that the data packets are delivered to the upper layer in an ascending order of the count values of the data packets. In addition, the count value may also be used to record a quantity of times of sending a same message or a same type of message, for example, a NAS count value.

The type parameter may be a service type of the user plane control PDU. For example, the control PDU of the PDCP layer may be used to transmit a status report, RoHC feedback, and EHC feedback. The control PDU of the RLC layer may be used to transmit a status report, and the like. The MAC CE of the MAC layer may be used to transmit a buffer status report (BSR), a C-RNTI, a UE contention resolution identity, a timing advance command, a secondary cell activation/deactivation (SCell Activation/Deactivation) message, a recommended bit rate, and the like. The MAC layer may determine the service type corresponding to the user plane control PDU, and determine the type parameter to perform the security processing. The MAC layer may read a field in a packet header of a PDU from the upper layer to determine the service type, for example, determine the type parameter by using a PDU type field in a packet header of a PDU from the PDCP layer; or the MAC layer may receive signaling from the upper layer, and the signaling indicates the type parameter corresponding to the user plane control PDU.

The radio bearer identifier may be a radio bearer identifier corresponding to the first control data. For example, a length of the radio bearer identifier is 5 bits.

The foregoing parameters provided in this embodiment of this application may be understood as input parameters for the first security processing. To ensure consistency between the transmit end and the receive end, the transmit end and the receive end may determine the foregoing input parameters according to a same preset rule. Alternatively, the transmit end may send at least one of the foregoing input parameters to the receive end. The transmit end may transmit the at least one of the foregoing input parameters in a packet header of the MAC PDU. For example, the transmit end reuses the field in the packet header of the MAC PDU to send the sequence number and the count value to the receive end, and the receive end performs the second security processing based on the received sequence number and the received count value. The first security processing and the second security processing use corresponding input parameters, so that the receive end can succeed in the decryption and/or the integrity verification performed on the control data that undergoes the encryption and/or the integrity protection at the transmit end, thereby implementing secure transmission.

The first security processing may include the encryption processing and/or the integrity protection processing. A security algorithm used for the first security processing may be a symmetric security algorithm or an asymmetric security algorithm, and may be, for example, a 5G security algorithm (such as network integrated authentication (NIA) integrity algorithm), a data encryption standard (DES) algorithm, a 3DES algorithm, or a Rivest-Shamir-Adleman (RSA) algorithm, or the like. The security algorithm may include an encryption algorithm or a decryption algorithm, and an integrity protection algorithm or an integrity verification algorithm.

For the encryption processing, the transmit end may perform encryption on the first control data based on the foregoing input parameter, and use generated ciphertext as the second control data. Correspondingly, the receive end performs decryption on the second control data based on a same data parameter, to obtain plaintext of the first control data, thereby implementing secure transmission.

For the integrity protection processing, the transmit end may perform processing on the first control data based on the foregoing input parameter, to obtain the second control data, that is, integrity check information. The integrity check information may be a message authentication code-integrity (MAC-I) or a digital signature.

Figure 5:
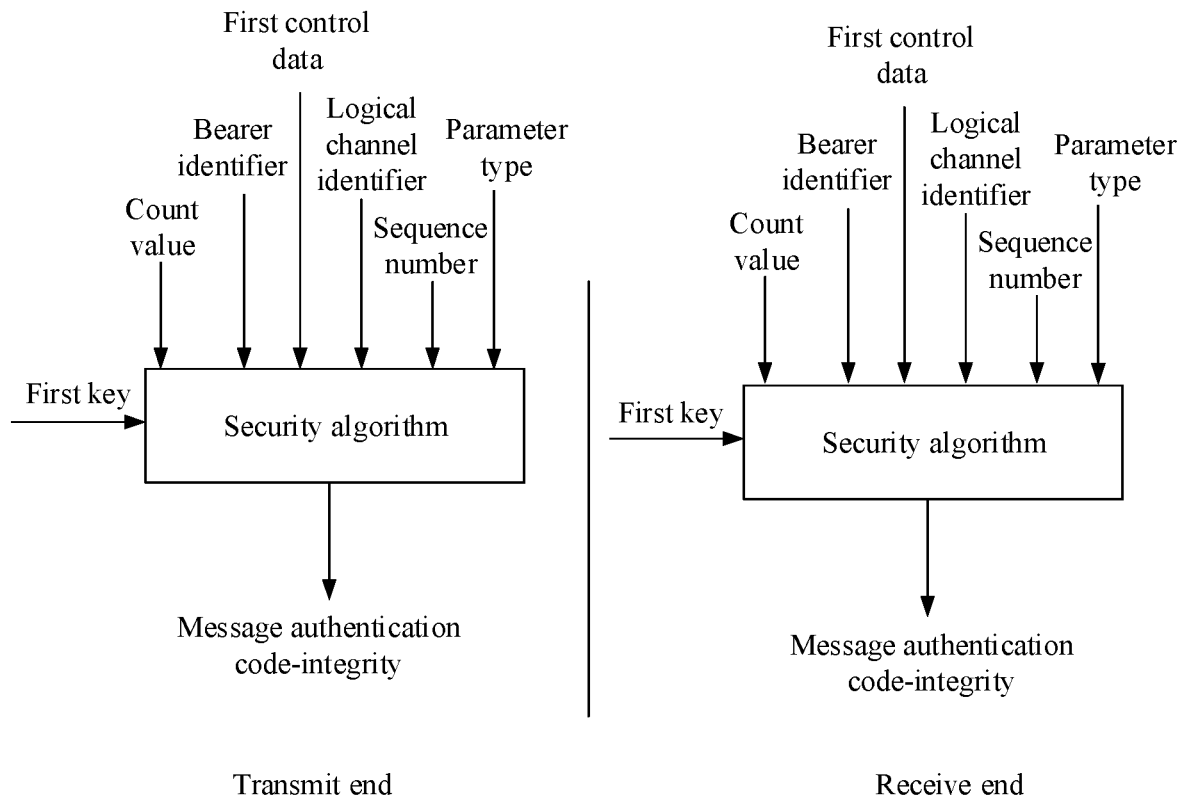
FIG. 5 is a schematic flowchart of generating first information according to an embodiment of this application.

For example, FIG. 5 is a schematic flowchart of generating a message authentication code-integrity according to an embodiment of this application. The transmit end uses a first key pair as a security key; uses at least one of the following: the sequence number, the count value, the type parameter, the logical channel identifier, and the radio bearer identifier of the first control data as the input parameter; and performs an operation on the at least one parameter by using the security algorithm, to generate the message authentication code-integrity. An example process of performing the operation on the at least one parameter by using the security algorithm is to use the at least one parameter as the input parameter of the security algorithm, and perform the operation based on an algorithm procedure of the security algorithm to obtain an output parameter. The output parameter may be used as the second control data.

A length of the integrity check information is variable. In other words, complete or truncated integrity check information may be used. In a possible implementation, the integrity check information is a truncated MAC-I. When the integrity check information is the truncated MAC-I, a length of the truncated MAC-I may be predefined by using a protocol, or a length of the truncated MAC-I is sent by the transmit end to the receive end. The length of the MAC-I may be included in the packet header or the load of the MAC subPDU. For example, after the integrity protection processing is performed on the first control data, the obtained MAC-I is truncated, and the field in the packet header of the MAC subPDU is reused to indicate the length of the truncated MAC-I. For example, if the transmit end truncates the MAC-I to 5 bits, the transmit end may send the length of the truncated MAC-I and the second control data to the receive end and the receive end truncates, based on the length, a MAC-I obtained through calculation, and then compares a truncated MAC-I with the second control data for verification. A MAC-I with a variable length may be obtained by truncating the MAC-I. In this way, the field in the packet header of the MAC PDU or a field in the packet header of the MAC subPDU may be reused to indicate the MAC-I, thereby more flexibly completing the security processing. The second control data may be included in the packet header or the load of the MAC subPDU. For example, after the integrity protection processing is performed on the first control data, the obtained MAC-I is indicated by using the field in the packet header of the MAC subPDU. After receiving the MAC subPDU, the receive end may perform the integrity verification processing on the load of the MAC subPDU, and compare an obtained MAC-I with the MAC-I in the packet header for verification.

As described in step S401, the first control data includes the at least one user plane control PDU. In a possible implementation, the first security processing is performed on at least two MAC subPDUs in the first control data to obtain the second control data. The MAC subPDU includes a control PDU or a MAC CE. The at least two MAC subPDUs belong to a same MAC PDU. In other words, when the MAC layer performs the first security processing on the MAC PDU, if a plurality of MAC subPDUs in the MAC PDU include data on which the first security processing needs to be performed, the first security processing may be performed on the plurality of MAC subPDUs together. In this case, only one piece of integrity check information needs to be generated, and different integrity check information does not need to be generated for the MAC subPDUs, thereby reducing implementation complexity and reducing transmission resources. For example, this may be implemented in the following two manners.

In a first possible implementation, the first security processing may be performed on the MAC PDU. For example, the MAC PDU or the load of the MAC PDU is used as the first control data, and the first control data includes a plurality of MAC subPDUs. The integrity protection processing is performed on the first control data to generate one piece of integrity check information, and the piece of the integrity check information is carried in the MAC PDU. For example, the piece of integrity check information may be carried in the packet header of the MAC PDU, the load of the MAC PDU, or a tail of the MAC PDU.

In a second possible implementation, the plurality of MAC subPDUs on which the first security processing needs to be performed may be combined for processing. For example, when the integrity protection is performed, uniform processing is performed on only the plurality of MAC subPDUs that are in the MAC PDU and on which the first security processing needs to be performed. In an example implementation, the plurality of MAC subPDUs on which the first security processing needs to be performed or loads of the MAC subPDUs may be connected in an order, the integrity protection processing is performed on an entity obtained after the connection, and one piece of integrity check information is generated and carried in the MAC PDU. For example, the piece of integrity check information may be carried in the packet header of the MAC PDU, the load of the MAC PDU, or a tail of the MAC PDU.

After performing the security processing, the transmit end may use security indication information to mark a case in which the security processing has been performed on the first control data, or further mark a type of the security processing performed on the first control data, for example, the encryption processing and/or the integrity protection processing. an existing field or a newly added field in the data packet may indicate the security indication information.

In a first implementation, a packet header of the second control data includes first security indication information, the first security indication information indicates that the second control data underwent the first security processing, and the first security processing includes the encryption processing and/or the integrity protection processing. For example, the second control data is a MAC subPDU. After performing encryption on the MAC subPDU, the transmit end uses a reserved field (for example, a new meaning is assigned to an R field) in the packet header of the MAC subPDU to indicate that the MAC subPDU underwent the encryption processing and did not undergo integrity protection processing. After receiving the data packet, the receive end may determine, based on the field, that the decryption processing needs to be performed on the MAC subPDU, and the integrity verification processing does not need to be performed on the MAC subPDU. For another example, a logical channel identifier (LCID) field (for example, a special value is assigned) in the packet header of the MAC subPDU may indicate the first security indication information.

In a second implementation, a packet header of a MAC PDU corresponding to the second control data includes second security indication information; and the second security indication information indicates whether the MAC PDU underwent the first security processing, or the second security indication information indicates that the MAC PDU includes a MAC subPDU that underwent the first security processing. For example, the second security indication information is indicated by using a reserved field in the packet header of the MAC PDU. Further, the packet header of the MAC PDU may indicate whether the plurality of MAC subPDUs undergo the first security processing. For example, the packet header of the MAC PDU indicates, in a form of a bitmap, whether the plurality of MAC subPDUs in the MAC PDU undergo the first security processing. Further, when receiving the MAC PDU, the receive end may determine whether each MAC subPDU underwent the security processing. Different bits in the bitmap correspond to different MAC subPDUs. When a value of a bit is "1", it may indicate that a MAC subPDU at a corresponding location underwent the security processing or a MAC subPDU at a corresponding location did not undergo the security processing.

In step S403, the transmit end sends the second control data to the receive end, and correspondingly, the receive end receives the second control data from the transmit end.

The second control data indicates data obtained after the first security processing is performed on the first control data. When the first security processing is the encryption processing, the second control data is encrypted ciphertext. When the first security processing is the integrity protection processing, the second control data is the message authentication code-integrity. When the first security processing is the encryption processing and the integrity protection processing, the transmit end may first perform the integrity protection processing, and then perform the encryption processing. In this case, the second control data may be understood as the message authentication code-integrity and encrypted first control data.

Optionally, the method further includes step S4031: The transmit end sends security parameter information to the receive end. The security parameter information includes the at least one parameter and/or the length of the integrity check information. Correspondingly, the receive end receives the at least one parameter and/or the length of the integrity check information from the transmit end. The at least one parameter may be at least one parameter needed in the first security processing. When the integrity check information has a variable length, the transmit end may send the length of the integrity check information to the receive end. For related definitions of the at least one parameter and the integrity check information, refer to the related description in step S402. The parameter information is sent, so that information of the receive end and the transmit end can be consistent. In this way, the receive end performs the second security processing by using a same parameter, thereby implementing secure transmission.

In step S404, the receive end performs the second security processing on the second control data. The second security processing includes the decryption processing and/or the integrity verification processing.

When the first security processing is the encryption processing, the second security processing is the decryption processing. When the first security processing is the integrity protection processing, the second security processing is the integrity verification processing. When the first security processing is the encryption processing and the integrity protection processing, the transmit end may first perform the decryption processing, and then perform the integrity verification processing on data obtained after the decryption.

The receive end may perform the second security processing based on the input parameter corresponding to the first security processing. The second security processing includes the decryption processing, and performing the second security processing on the second control data is based on the second control data and a key; and/or the second security processing includes the integrity verification processing, and performing the second security processing on the second control data is based on the first control data and at least one of the following parameters:

a first key;
a sequence number corresponding to the first control data;
a count value corresponding to the first control data;
a type parameter corresponding to the first control data;
a logical channel identifier corresponding to the first control data; or
a radio bearer identifier corresponding to the first control data.

For meanings of the foregoing parameters, refer to the related description in step S402.

Optionally, before step S404, the method further includes step S4041: The receive end determines that the second security processing is to be performed on the second control data. In a first implementation, the receive end may determine, according to a preset rule, that the second security processing is to be performed on the second control data. For example, the preset rule may be that the first security processing is performed on all the MAC PDUs. In this case, when receiving the data packet, the receive end determines that the second security processing needs to be performed on all the MAC PDUs. In a second implementation, a preset rule may be that the receive end determines, based on the preset or pre-indicated first control data type, that the second security processing is to be performed on the second control data. For example, if the preset first control data type is the MAC CE, when receiving the data packet, the receive end performs the second security processing on only the MAC subPDU including the MAC CE. In a third implementation, the receive end determines, based on the security indication information, that the second security processing is to be performed on the second control data. The security indication information may be carried in the inter-layer signaling or a field in the data packet. In a fourth implementation, the receive end may determine, according to a preset rule or based on pre-indication information, a service type of control data on which the second security processing needs to be performed. For example, it is pre-specified that the second security processing needs to be performed on a MAC CE of a carrier activation or deactivation function. In a fifth implementation, the receive end may determine, according to a preset rule or based on pre-indication information, a radio bearer on which the second security processing needs to be performed. For example, it is preconfigured that the security processing needs to be performed on the first radio bearer, and the receive end may determine that the second security processing needs to be performed on the control data transmitted on the first radio bearer. In the first to the fifth implementations, the preset rule may be predefined by a protocol, and the pre-indication information may be preconfigured by the network device by sending indication information to the terminal device.

When the second security processing includes the integrity verification processing, in a possible implementation, when a result of performing the integrity verification processing on the second control data is a failure or decryption fails, a data packet corresponding to the second control data is discarded. For example, the MAC layer performs the integrity protection processing on the second control data. The MAC layer compares, for verification, generated integrity check information with integrity check information generated by the transmit end. If a result of the integrity verification processing is a success, it may be determined that the second control data is completely transmitted, and the MAC layer performs subsequent processing. If a result of the integrity verification processing is a failure, the MAC layer may discard the data packet corresponding to the second control data, for example, discard a MAC PDU including the second control data, or discard a MAC subPDU corresponding to the second control data.

Further, the MAC layer may further send the second indication information to the transmit end or another protocol layer. The second indication information indicates that the result of performing the integrity verification processing on the second control data is a failure, or the second indication information indicates that the decryption performed on the second control data fails, or the second indication information indicates that transmission of the data packet corresponding to the second control data fails. For example, the MAC layer may send the second indication information to the transmit end. After receiving the second indication information, the transmit end may determine that data transmission fails, and initiate retransmission. For another example, when the MAC layer determines that a control PDU whose result of the integrity verification processing is a failure comes from the RLC layer of the transmit end, the MAC layer may send the second indication information to the RLC layer of the receive end, to indicate that data transmission at a corresponding protocol layer fails. The corresponding protocol layer may collect statistics. In this way, the transmit end or the another protocol layer may learn of a data transmission status, and perform processing in time, thereby improving communication efficiency of a communication system. An order of two steps of sending the second indication information and discarding the data packet is not limited in this application. Optionally, the second indication information includes a sequence number or an identifier of a data packet, to indicate a data packet that fails to be transmitted, so that the transmit end or the another protocol layer can determine the data packet that fails to be transmitted, and make a response. For example, if the receive end fails to decrypt the second control data, the receive end sends the second indication information to the transmit end. The second indication information includes the sequence number, and indicates that the data packet corresponding to the sequence number fails to be transmitted. After receiving the second indication information, the transmit end may resend the corresponding data packet, thereby implementing secure data transmission.

For an implementation in which the receive end determines that the second security processing is to be performed on the second control data and the receive end performs the second security processing on the second control data, refer to the related description in step S402. Details are not described herein again.

As described in step S402, in a possible implementation, the transmit end may perform the first security processing on the at least two MAC subPDUs in the first control data to obtain the second control data. Correspondingly, the receive end may perform the second security processing on at least two MAC subPDUs in the second control data. The MAC subPDU includes a control PDU or a MAC CE. The at least two MAC subPDUs belong to a same MAC PDU. For corresponding processing performed by the receive end and the transmit end, refer to the related description in step S402.

In a first possible implementation, the receive end performs the second security processing on the MAC PDU. For example, the receive end performs the integrity protection processing on the MAC PDU or the load of the MAC PDU, and compares, for verification, the generated integrity check information with the integrity check information generated by the transmit end.

In a second possible implementation, a plurality of MAC subPDUs on which the second security processing needs to be performed may be combined for processing. For example, after the plurality of MAC subPDUs (or loads of the MAC subPDUs) on which the second security processing needs to be performed are extracted and connected in an order, the integrity protection processing is performed on the connected MAC subPDUs as a whole, and generated integrity check information is compared for verification with integrity check information generated by the transmit end.

According to the communication method provided in this embodiment of this application, the first security processing is performed on the user plane control PDU, thereby improving communication security and reducing a risk of being attacked by an illegal network device. Security processing rules can be configured based on service types and different security requirements, to implement secure transmission of diversified services. After the security processing, the transmit end may indicate, to the receive end by using the security indication information, the PDU on which the security processing is performed, to help the receive end perform the corresponding second security processing.

Figure 6A:
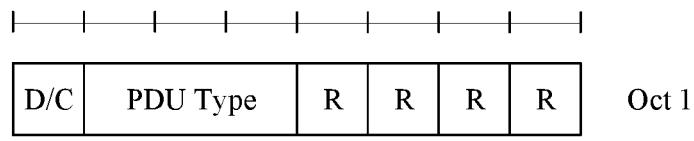
FIG. 6A is a schematic diagram of a packet header of a control PDU at a PDCP layer.
Figure 6B:
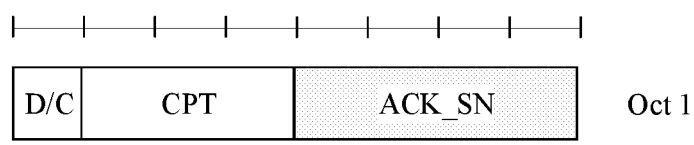
FIG. 6B is a schematic diagram of a packet header of a STATUS PDU at an RLC layer.
Figure 6C:
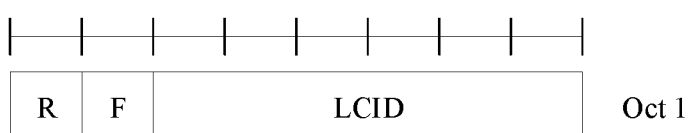
FIG. 6C is a schematic diagram of a packet header of a MAC subPDU at a MAC layer.

As described above, only processing at the MAC layer is used as an example in the foregoing. In a secure transmission solution provided in this embodiment of this application, processing may be performed at each protocol layer. A protocol may be used to predefine a user plane control PDU on which the security processing needs to be performed, and a type of security processing (the encryption and/or integrity protection processing) that needs to be performed; or RRC signaling or system information may indicate a user plane control PDU on which the security processing needs to be performed, and a type of security processing that needs to be performed. For example, the foregoing security processing may also be performed at the SDAP layer, the PLDP layer, and the RLC layer. FIG. 6A, FIG. 6B, and FIG. 6C are schematic diagrams of packet headers respectively at the PDCP layer, the RLC layer, and the MAC layer. Further, the security indication information may be added to a packet header of a corresponding control PDU, to indicate a security processing type and whether the security processing is performed on the corresponding PDU.

FIG. 6A is a schematic diagram of a packet header of a control PDU at the PDCP layer. A field D/C occupies 1 bit, and indicates whether a corresponding PDCP PDU is a data PDU or a control PDU. A field PDU type occupies 3 bits, and indicates a type of control information in a corresponding PDCP control PDU. A field R occupies 1 bit, and is a reserved field. A default value may be set to 0. For the security processing performed at the PDCP layer, the R field in a packet header of the PDCP PDU may be used, or the PDU type field may be reused, to indicate a type of the performed security processing and/or whether the security processing is performed.

FIG. 6B is a schematic diagram of a packet header of a STATUS PDU in the RLC layer. The STATUS PDU is a control PDU, and is used to perform an automatic retransmission process. The packet header of the STATUS PDU includes a field D/C and a control PDU type (CPT) field. The field D/C occupies 1 bit, and indicates whether a corresponding RLC PDU is a data PDU or a control PDU. For example, if the field D/C is 0, it indicates that the RLC PDU is the control PDU; or if the field D/C is 1, it indicates that the RLC PDU is the data PDU. The CPT field occupies 3 bits, and indicates a type of the RLC control PDU. For example, if the CPT field is 000, it indicates that the RLC PDU is a STATUS PDU. For the security processing performed at the RLC layer, the CPT field in a packet header of an RLC PDU may indicate the type of the performed security processing and/or whether the security processing is performed. For example, a bit value (other than 000) of the CPT field indicates the security indication information.

FIG. 6C is a schematic diagram of a packet header of a MAC subPDU at the MAC layer. A logical channel identifier field occupies 6 bits, and indicates a logical channel instance corresponding to a MAC SDU or a type of a corresponding MAC CE. A field R is a reserved field, and a field F is a format field. For each MAC CE with a variable length, a packet header of a MAC subPDU corresponding to the MAC CE may include the field F to indicate a size of a length field. The field F occupies 1 bit. For example, if a bit of the field F is 0, it may indicate that the size of the length field is 8 bits; or if a bit of the field F is 1, it may indicate that the size of the length field is 16 bits. For the security processing performed at the MAC layer, the R field in a packet header of the MAC PDU may indicate whether the security processing is performed and/or the type of the performed security processing.

FIG. 6A to FIG. 6C are merely examples. Actually, a packet header of each protocol layer may include another field type or correspond to another field length. A specific format of the packet header is not limited in this application. The security indication information may indicate that the security processing is performed on the PDU, and may further indicate that the security processing is performed on which subPDU in the PDU. Based on the security indication information, the receive end may determine a type of security processing performed in the PDU or the security processing performed on which subPDU in the PDU, to perform the second security processing on a received data packet, thereby implementing secure transmission.

Further, it may be predefined or dynamically indicated that the security processing is performed at a plurality of protocol layers, or the security processing is performed at only one protocol layer. Details are provided in the following two implementations.

In an implementation, the plurality of protocol layers each perform the security processing on a control PDU generated by the protocol layer, and then send a processed control PDU to a next layer. Each of the plurality of protocol layers processes only the control PDU generated by the protocol layer. For example, the PLDP layer, the RLC layer, and the MAC layer all support the security processing. The first security processing is performed at the PLDP layer on first control PDU generated at the PLDC layer, and then a processed first control PDU is sent to the RLC layer. The RLC layer performs the first security processing on a second control PDU generated at the RLC layer, and then sends a processed second control PDU to the MAC layer. The MAC layer performs the first security processing on a MAC CE, and then sends a processed MAC CE to the PHY layer and the receive end. Correspondingly, the receive end performs the second security processing on the MAC CE at the MAC layer, performs the second security processing on the second control PDU at the RLC layer, and performs the second security processing on the first control PDU at the PDCP layer, thereby implementing secure transmission of the control PDU. The security processing is separately performed on the control PDU generated by each layer at each layer, and a type of the control PDU does not need to be indicated to another layer, thereby reducing inter-layer signaling interaction and reducing overheads.

In another implementation, the security processing is performed at a protocol layer on a control PDU generated at the current layer and an upper layer. For example, the MAC layer described above performs the security processing on a MAC CE and control PDUs from the SDAP layer, the PDCP layer, and the RLC layer. According to a corresponding method, the RLC layer may also perform the security processing on a control PDU generated at the RLC layer and control PDUs from the SDAP layer and the PDCP layer. The security processing is performed at one layer on control PDUs generated by a plurality of layers, thereby implementing security transmission and reducing complexity.

When the first control data type is DCI, the first security processing is performed at the PHY layer of the transmit end, and the second security processing is performed at the PHY layer of the receive end. All content described in the foregoing embodiments may be applied to the security processing performed on the DCI. The following describes in detail a possible process of performing the security processing on the DCI.

In step S401, the transmit end determines the first control data. This step may have the following two implementations:

In a possible implementation, it may be predefined or preconfigured that the security processing is performed on the DCI, or the security processing is performed on a first type of DCI. The first type includes at least one of the following: a DCI format 0_0, a DCI format 0_1, a DCI format 1_0, a DCI format 1_1, a DCI format 2_0, a DCI format 2_1, a DCI format 2_2, or a DCI format 2_3. For example, it may be preconfigured that the security processing is performed on DCI in the DCI format 0_0 type. In this case, the transmit end performs the first security processing on the DCI in the DCI format 0_0 type, and the receive end performs the second security processing on the DCI in the DCI format 0_0 type.

In another possible implementation, the transmit end may determine, according to a service requirement, to perform the first security processing on the DCI; and indicate, to the receive end by using third indication information, that the first security processing is performed on the DCI. The third indication information may be included in the DCI, or may be carried in another message. For example, after performing the integrity protection processing on the DCI, the transmit end transmits a generated digital signature by using a field in the DCI. After receiving the DCI, the receive end may determine, based on the field, that the first security processing is performed on the DCI, and then perform the second security processing on the DCI.

In step S402, the transmit end performs the first security processing on the first control data of the user plane to obtain the second control data. When the first security processing is the integrity protection processing, the transmit end may add effective integrity check information to the DCI and send the DCI to the receive end or may send effective integrity check information to the receive end by using another message, where the DCI indicates a time domain resource and/or a frequency domain resource used to transmit the integrity check information.

In step S404, the receive end performs the second security processing on the second control data. When the second security processing is the integrity verification processing, the receive end performs the integrity protection processing on the DCI, and compares generated integrity check information with the integrity check information from the transmit end for verification. If the verification succeeds, it is determined that the DCI is legal or valid. If the verification fails, it is determined that transmission of the DCI fails or the DCI is illegal or invalid. Further, the receive end may no longer parse a parameter in the DCI, or ignore functions of a parameter in the DCI, or no longer receive a scheduled channel.

The security processing is performed on the DCI, thereby improving DCI transmission security and service transmission reliability. In the communication methods provided in this application, the security processing may be performed at different protocol layers, to meet different service requirements or requirements for secure transmission, thereby implementing diversified designs. In addition, secure transmission is met, while transmission overheads and implementation complexity are reduced.

The different embodiments described above may be used in combination or independently. In addition, a relationship between steps of each embodiment is not forcibly limited. In other words, not all the steps are mandatory, and some of the steps may be selected according to an actual requirement for implementation.

To implement functions in the methods provided in embodiments of this application, the access network device, the terminal device, or a communication apparatus may include a hardware structure and/or a software module, and implement the functions in a form of the hardware structure, the software module, or a combination of the hardware structure and the software module. Whether a function in the foregoing functions is performed by the hardware structure, the software module, or the combination of the hardware structure and the software module depends on particular application and design constraint conditions of the technical solutions.

In embodiments of this application, division into the modules is an example, and is merely logical function division. In actual implementation, there may be another division manner. In addition, functional modules in embodiments of this application may be integrated into one processor, or may exist alone physically, or two or more modules may be integrated into one module. The integrated module may be implemented in a form of hardware, or may be implemented in a form of a software functional module.

Figure 7:
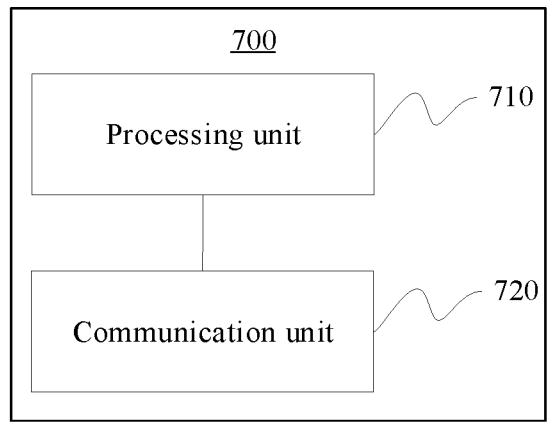
FIG. 7 is a schematic diagram of a structure of a communication apparatus according to an embodiment of this application.

As shown in FIG. 7, an embodiment of this application further provides an apparatus 700. The communication apparatus 700 may be the terminal device in FIG. 1, and is configured to implement the method corresponding to the terminal device in the foregoing method embodiments. Alternatively, the communication apparatus may be the access network device in FIG. 1, and is configured to implement the method corresponding to the access network device in the foregoing method embodiments. For examples of functions, refer to the descriptions in the foregoing method embodiments.

The apparatus 700 may include a processing unit 710 and a communication unit 720. In this embodiment of this application, the communication unit may also be referred to as a transceiver unit, and may include a sending unit and/or a receiving unit that are respectively configured to perform sending and receiving steps of the network device or the terminal device in the foregoing method embodiments. The following describes communication apparatuses provided in embodiments of this application in detail with reference to FIG. 7 and FIG. 8.

In some possible implementations, behaviors and functions of the transmit end in the foregoing method embodiments may be implemented by the communication apparatus 700, for example, the method performed by the transmit end in the embodiment of FIG. 4. For example, the communication apparatus 700 may be the access network device or the terminal device; or may be a component (for example, a chip or a circuit) used in the access network device or the terminal device; or may be a chip, a chip group, or a part of a chip in the access network device or the terminal device, where the part of the chip is configured to perform a related function in a method. The communication unit 720 may be configured to perform a receiving or sending operation performed by the transmit end in the embodiment shown in FIG. 4. The processing unit 710 may be configured to perform an operation, other than the receiving or sending operation, performed by the transmit end in the embodiment shown in FIG. 4.

The processing unit is configured to perform first security processing on first control data of a user plane to obtain second control data. The first security processing includes encryption processing and/or integrity protection processing.

The communication unit is configured to send the second control data.

In a possible implementation, the processing unit is further configured to determine, based on a preset first control data type, that the first security processing is to be performed on the first control data.

The first control data type includes one or more of the following control data types: a control protocol data unit PDU from a service data adaptation protocol SDAP layer; a control PDU from a packet data convergence protocol PDCP layer; a control PDU from a radio link control RLC layer; or a media access control layer control element MAC CE.

In a possible implementation, the processing unit is configured to:

obtain first indication information, where the first indication information indicates that a first data packet belongs to the first control data type; determine the first control data based on the first data packet; and determine to perform the first security processing on the first control data.

In a possible implementation, the first security processing is performed at a MAC layer.

In some possible implementations, behaviors and functions of the receive end in the foregoing method embodiments may be implemented by the communication apparatus 700, for example, the method performed by the receive end in the embodiment of FIG. 4. For example, the communication apparatus 700 may be the access network device or the terminal device; or may be a component (for example, a chip or a circuit) used in the access network device or the terminal device; or may be a chip, a chip group, or a part of a chip in the access network device or the terminal device, where the part of the chip is configured to perform a related function in a method. The communication unit 720 may be configured to perform a receiving or sending operation performed by the receive end in the embodiment shown in FIG. 4. The processing unit 710 may be configured to perform an operation, other than the receiving or sending operation, performed by the receive end in the embodiment shown in FIG. 4.

The communication unit is configured to receive second control data of a user plane.

The processing unit is configured to perform second security processing on the second control data. The second security processing includes decryption processing and/or integrity verification processing.

In a possible implementation, a packet header of the second control data includes first security indication information, the first security indication information indicates that the second control data underwent the first security processing, and the first security processing includes encryption processing and/or integrity protection processing.

In a possible implementation, performing the second security processing on the second control data is based on at least one of the following parameters: a sequence number corresponding to the first control data; a count value corresponding to the first control data; a type parameter corresponding to the first control data; a logical channel identifier corresponding to the first control data; or a radio bearer identifier corresponding to the first control data.

In a possible implementation, the second security processing is performed at a MAC layer.

It should be understood that descriptions of apparatus embodiments correspond to descriptions of the method embodiments. For a structure of an apparatus configured to implement the transmit end and the receive end in FIG. 4, refer to the apparatus 700. Therefore, for content that is not described in detail, refer to the foregoing method embodiments. For brevity, details are not described herein again.

The communication unit may also be referred to as a transceiver module, a transceiver, a transceiver machine, a transceiver apparatus, or the like. The processing unit may also be referred to as a processor, a processing board, a processing module, a processing apparatus, or the like. Optionally, a component that is in the communication unit 720 and that is configured to implement a receiving function may be considered as a receiving unit, and a component that is in the communication unit 720 and that is configured to implement a sending function may be considered as a sending unit. In other words, the communication unit 720 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receiver circuit, or the like. The sending unit sometimes may also be referred to as a transmitter machine, a transmitter, a transmitter circuit, or the like.

The foregoing is merely examples. The processing unit 710 and the communication unit 720 may further perform other functions. For more detailed descriptions, refer to related descriptions in the method embodiment shown in FIG. 4. Details are not described herein again.

Figure 8:
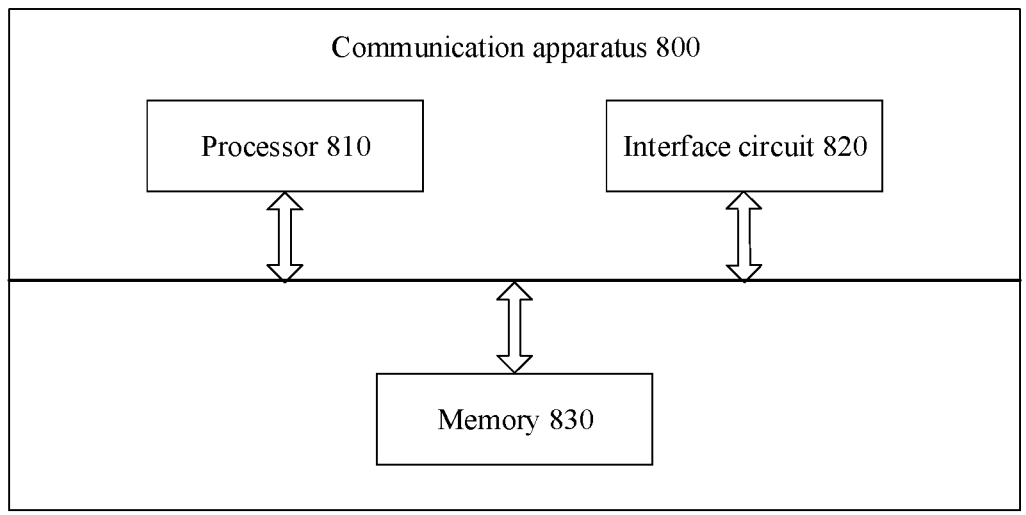
FIG. 8 is a schematic diagram of a structure of a communication apparatus according to an embodiment of this application.

FIG. 8 shows an apparatus 800 provided in an embodiment of this application. The apparatus shown in FIG. 8 may be an implementation of a hardware circuit of the apparatus shown in FIG. 7. The communication apparatus is applicable to the foregoing flowchart, and performs functions of the terminal device or the network device in the foregoing method embodiments. For ease of description, FIG. 8 shows only main components of the communication apparatus.

As shown in FIG. 8, the communication apparatus 800 includes a processor 810 and an interface circuit 820. The processor 810 and the interface circuit 820 are coupled to each other. It may be understood that the interface circuit 820 may be a transceiver or an input/output interface. Optionally, the communication apparatus 800 may further include a memory 830, configured to: store instructions executed by the processor 810, store input data required by the processor 810 to run instructions, or store data generated after the processor 810 runs instructions. In FIG. 8, the memory is located inside the communication apparatus 800. During implementation, the memory 830 may be alternatively located outside the communication apparatus 800.

When the communication apparatus 800 is configured to implement the method shown in FIG. 4, the processor 810 is configured to execute a computer program or the instructions stored in the memory to perform the functions of the terminal device or the network device in the foregoing method embodiments. The processor 810 may be configured to implement functions of the processing unit 901. The interface circuit 820 is configured to: receive a signal from another communication apparatus other than the communication apparatus, and transmit the signal to the processor; or send a signal from the processor to another communication apparatus other than the communication apparatus. The interface circuit 820 may be configured to implement functions of the communication unit 720.

When the communication apparatus is a chip used in the terminal device, the chip in the terminal device implements the functions of the terminal device in the foregoing method embodiments. The chip in the terminal device receives information from another module (for example, a radio frequency module or an antenna) in the terminal device. The information is sent by the access network device to the terminal device. Alternatively, the chip in the terminal device sends information to another module (for example, a radio frequency module or an antenna) in the terminal device. The information is sent by the terminal device to the access network device.

When the communication apparatus is a chip used in the access network device, the chip in the access network device implements the functions of the network device in the foregoing method embodiments. The chip in the access network device receives information from another module (for example, a radio frequency module or an antenna) in the access network device. The information is sent by the terminal device to the network device. Alternatively, the chip in the access network device sends information to another module (for example, a radio frequency module or an antenna) in the access network device. The information is sent by the access network device to the terminal device.

The processor in this embodiment of this application may be a central processing unit (CPU), or may be another general-purpose processor, a digital signal processor (DSP), an application-specific integrated circuit (ASIC), a field programmable gate array (FPGA), another programmable logic device, or a transistor logic device. The general-purpose processor may be a microprocessor, or may be any conventional processor.

In this embodiment of this application, the memory may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, or any other form of storage medium well-known in the art. For example, the storage medium is coupled to the processor, so that the processor can read information from the storage medium and write information into the storage medium. Certainly, the storage medium may be alternatively a component of the processor. The processor and the storage medium may be disposed in an ASIC. In addition, the ASIC may be located in the network device or the terminal device. The processor and the storage medium may alternatively exist in the network device or the terminal device as discrete components.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of the computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer programs or instructions may be alternatively stored in a computer-readable memory that can instruct a computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

What is claimed is:

1. A method, comprising:
performing first security processing, at a media access control (MAC) layer, on first control data of a user plane to obtain second control data, the first security processing comprises at least one of encryption processing or integrity protection processing, and wherein the performing the first security processing comprises:

performing the first security processing on at least two MAC sub protocol data units (PDUs) in the first control data to obtain the second control data, wherein a MAC subPDU in the at least two MAC subPDUs comprises a control PDU or a MAC control element (CE), and the at least two MAC subPDUs belong to a same MAC PDU; and sending the second control data, wherein a packet header of the second control data comprises first security indication information, and the first security indication information indicates that the second control data underwent the first security processing.

2. The method according to claim 1, wherein before the performing the first security processing, at the MAC layer, on the first control data of the user plane to obtain the second control data, the method further comprises:

determining, based on a preset first control data type, that the first security processing is to be performed on the first control data; and the first control data type comprises one or more of the following control data types:
a control PDU from a service data adaptation protocol (SDAP) layer;
a control PDU from a packet data convergence protocol (PDCP) layer;
a control PDU from a radio link control (RLC) layer; or
a MAC CE.

3. The method according to claim 2, wherein the determining, based on the preset first control data type, that the first security processing is to be performed on the first control data comprises:

obtaining first indication information, wherein the first indication information indicates that a first data packet belongs to the first control data type; determining the first control data based on the first data packet; and determining to perform the first security processing on the first control data.

4. The method according to claim 1, wherein the performing the first security processing, at the MAC layer, on the first control data is based on at least one of the following parameters:
a sequence number corresponding to the first control data;
a count value corresponding to the first control data;
a type parameter corresponding to the first control data;
a logical channel identifier corresponding to the first control data; or
a radio bearer identifier corresponding to the first control data.

5. The method according to claim 1, wherein a packet header of a MAC PDU corresponding to the second control data comprises second security indication information; and the second security indication information indicates whether the MAC PDU underwent the first security processing, or the second security indication information indicates that the MAC PDU comprises a MAC subPDU that underwent the first security processing.

6. The method according to claim 1, wherein integrity check information corresponding to the integrity protection processing comprises a message authentication code-integrity or a truncated message authentication code-integrity.

7. A method, comprising:
receiving second control data via a user plane, wherein a packet header of the second control data comprises first security indication information, the first security indication information indicates that the second control data underwent first security processing, and the first security processing comprises at least one of encryption processing or integrity protection processing; and performing second security processing, at a media access control (MAC) layer, on the second control data, wherein the second security processing comprises at least one of decryption processing or integrity verification processing, and the preforming the second security processing comprises:

performing the second security processing on at least two MAC sub protocol data units (PDUs) in the second control data, wherein a MAC subPDU in the at least two MAC subPDUs comprises a control PDU or a MAC control element (CE), and the at least two MAC subPDUs belong to a same MAC PDU.

8. The method according to claim 7, wherein the performing the second security processing, at the MAC layer, on the second control data is based on at least one of the following parameters:
a sequence number corresponding to first control data;
a count value corresponding to the first control data;
a type parameter corresponding to the first control data;
a logical channel identifier corresponding to the first control data; or
a radio bearer identifier corresponding to the first control data.

9. An apparatus, comprising:
one or more processors; and
one or more memories coupled to the one or more processors and storing programming instructions for execution by the one or more processors to cause the apparatus to:

perform first security processing, at a media access control (MAC) layer, on first control data of a user plane to obtain second control data, the first security processing comprises at least one of encryption processing or integrity protection processing, and wherein the performing the first security processing comprises:

performing the first security processing on at least two MAC sub protocol data units (PDUs) in the first control data to obtain the second control data, wherein a MAC subPDU in the at least two MAC subPDUs comprises a control PDU or a MAC control element (CE), and the at least two MAC subPDUs belong to a same MAC PDU; and send the second control data, wherein a packet header of the second control data comprises first security indication information, and the first security indication information indicates that the second control data underwent the first security processing.

10. The apparatus according to claim 9, wherein before the performing the first security processing, at the MAC layer, on the first control data of the user plane to obtain the second control data, the apparatus is further caused to:

determine, based on a preset first control data type, that the first security processing is to be performed on the first control data; and the first control data type comprises one or more of the following control data types:
a control PDU from a service data adaptation protocol (SDAP) layer;
a control PDU from a packet data convergence protocol (PDCP) layer;
a control PDU from a radio link control (RLC) layer; or
a MAC CE.

11. The apparatus according to claim 10, wherein the determining,
  based on the preset first control data type, that the first security processing is to be performed on the first control data comprises:
  obtaining first indication information, wherein the first indication information indicates that a first data packet belongs to the first control data type; determining the first control data based on the first data packet; and determining to perform the first security processing on the first control data.

12. The apparatus according to claim 9, wherein the performing the first security processing, at the MAC layer, on the first control data is based on at least one of the following parameters:
  a sequence number corresponding to the first control data;
  a count value corresponding to the first control data;
  a type parameter corresponding to the first control data;
  a logical channel identifier corresponding to the first control data; or
  a radio bearer identifier corresponding to the first control data.

\* \* \* \* \*